United States Patent [19]

Daloisio

[11] Patent Number: 4,511,154
[45] Date of Patent: Apr. 16, 1985

[54] TILT TRUCK
[75] Inventor: Pasquale C. Daloisio, New Hope, Pa.
[73] Assignee: Plastech International, Inc., Warminster, Pa.
[21] Appl. No.: 449,140
[22] Filed: Dec. 13, 1982
[51] Int. Cl.³ .............................................. B62D 3/08
[52] U.S. Cl. ................................. 280/47.26; 296/184; 298/2; 414/425
[58] Field of Search ................ 280/47.12, 47.3, 47.31, 280/47.32, 47.34, 62, 47.26; 414/425; 296/184; 298/2

[56] References Cited

U.S. PATENT DOCUMENTS

| | | | |
|---|---|---|---|
| 2,742,300 | 4/1956 | Carver | 280/47.31 |
| 3,279,811 | 10/1966 | Mitty et al. | 280/47.26 |
| 3,346,271 | 10/1967 | Parsons | 280/47.34 |
| 3,858,929 | 1/1975 | Brescia | 298/2 |
| 4,331,341 | 5/1982 | McKeown | 280/47.34 |

Primary Examiner—Richard A. Bertsch
Attorney, Agent, or Firm—John F. A. Earley; John F. A. Earley, III

[57] ABSTRACT

A tilt truck which comprises a double-walled integral tank and frame of one-piece construction having an open top with a tilt front wall connected to a back wall by a pair of side walls and having a bottom wall connected to the bottom portion of the front, back and side walls, wherein the front wall slants away from the bottom wall, a rocker base is formed in the bottom portion of the front wall, push-pull and tilt hand holes are molded into back wall, and the tilt truck is rust proof, easily cleaned, easily handled and light in weight.

10 Claims, 7 Drawing Figures

TILT TRUCK

BACKGROUND OF THE INVENTION

1. Field of the Invention

This invention relates to tilt trucks which may be loaded and used to handle all sorts of materials but which are especially suitable for ingredients or refuse in a food processing plant.

2. Description of the Prior Art

Prior art tilt trucks comprise a polyethylene plastic single wall tank having front, back, side and bottom walls with an open top. The tank is mounted in a separate square-tubed steel frame having a handle, a rocker portion, a tilt stop, and wheels. Such tilt trucks are designed for moving and dumping of solid materials by one man, but are heavy and hard to handle. Also, the metal frames can rust, or bend and form sharp edges that are dangerous.

SUMMARY OF THE INVENTION

It is an object of this invention to provide a tilt truck which may be used for the easy moving and dumping of solid materials by one man, which is cleaner than tilt trucks with metal frames, and which eliminates the problems of metal frames rusting, or bending and forming dangerous sharp edges.

It is another object to provide a tilt truck which is easier to clean than tilt trucks having metal frames.

It is another object to provide a tilt truck which is easier to handle than tilt trucks with metal frames.

These objects of the invention are accomplished by providing a tilt truck with an integral tank and frame of plastic and without a separate metal frame, and which is of one-piece double wall construction made of FDA-approved polyethylene. This tilt truck is lighter in weight than conventional tilt trucks with separate metal frames, and is therefore easier to handle. It is also cleaner and easier to clean than tilt trucks with separate metal frames, and the absence of a metal frame eliminates the problems of the metal rusting, or the metal frame bending and forming dangerous sharp edges.

BRIEF DESCRIPTION OF THE DRAWINGS

Turning now to the drawings.

DETAILED DESCRIPTION

Figure 1:
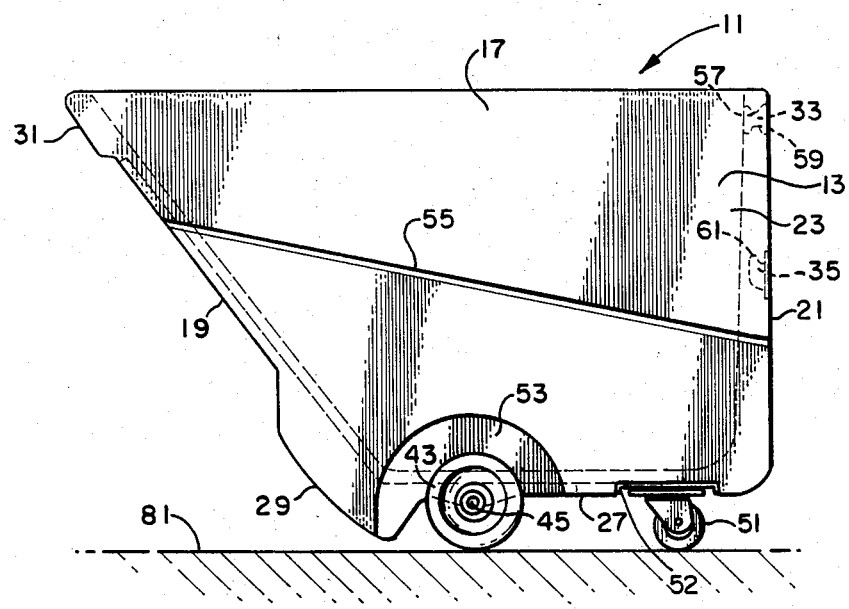
FIG. 1 is a view in side elevation of a tilt truck constructed in accordance with this invention.
Figure 2:
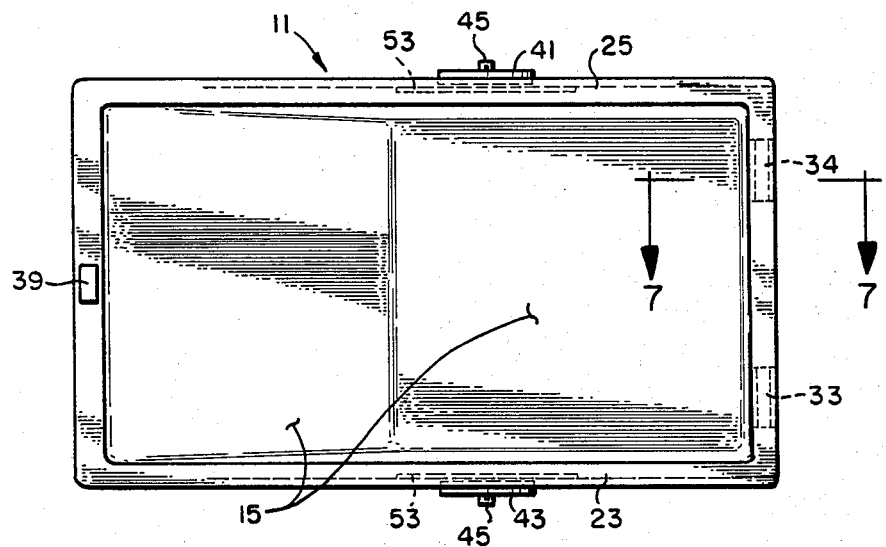
FIG. 2 is a view in top plan of the tilt truck of FIG. 1.
Figure 3:
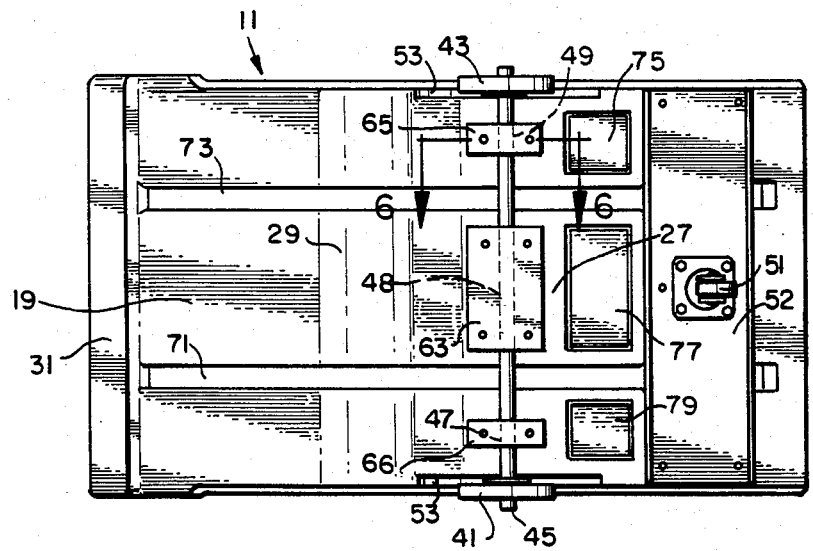
FIG. 3 is a view in bottom plan of the tilt truck of FIG. 1.
Figure 4:
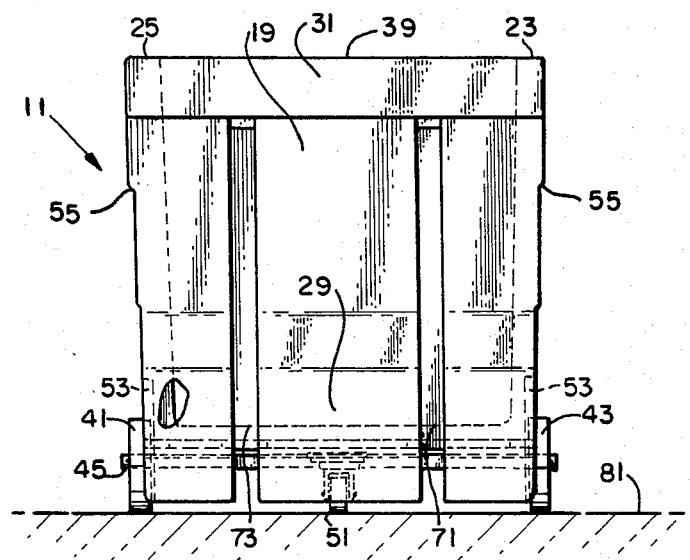
FIG. 4 is a view in elevation of the front of the tilt truck.
Figure 5:
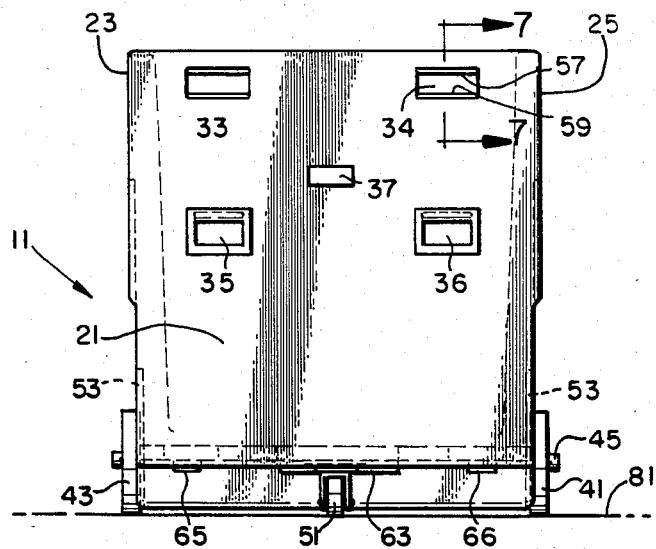
FIG. 5 is a view in elevation of the back of the tilt truck.
Figure 6:
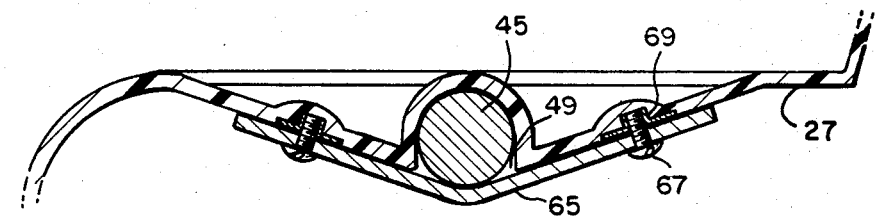
FIG. 6 is a view in section taken as indicated by the lines and arrows 6—6 which appear in FIG. 3.
Figure 7:
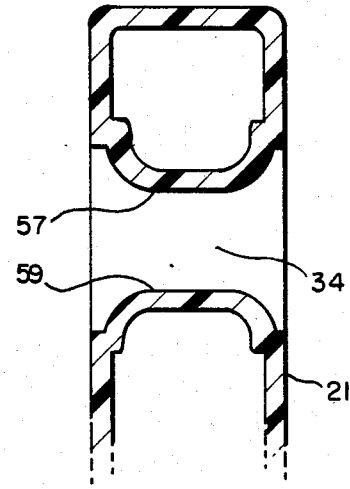
FIG. 7 is a view in section taken as indicated by the lines and arrows 7—7 which appear in FIG. 2 and FIG. 5.

As illustrated in the drawings, there is shown a tilt truck 11 which comprises a double-walled integral tank and frame 13 having seamless inner wall 15 and outer wall 17 molded of FDA-approved polyethylene plastic.

The term "plastic" is used herein in its most common sense to mean synthetic resins that are moldable into various forms and are hardened for commercial and industrial use.

Integral tank and frame 13 is of one-piece construction and has a front tilt wall 19 connected to a back wall 21 by a pair of side walls 23 and 25, and has a bottom wall 27 connected to the bottom portions of the front, back and side walls.

Tilt front wall 19 is slanted away from bottom wall 27, and a rocker base 29 is formed in the lower portion of the outer wall of front wall 19.

A tilt stop 31 is formed in the upper portion of the tilt truck 11 of the outer wall of front wall 19, and hand holes 33, 34, 35 and 36 are formed in the outer wall of back wall 21, with the top hand holes 33,34 being molded through the top portion of back wall 21 for easier pushing and pulling, and hand holes 35,36 being located below hand holes 33,34 with hand holes 35,36 being adapted for easier tilting of truck 11.

An identification plate 37 may be molded into the outer wall of back wall 21, and another identification plate 39 may be molded into the top edge portion of front wall 19.

A pair of wheels 41,43 are mounted on an axle 45 which is seated in the rounded grooves 47–49 molded into the outside wall of bottom wall 27.

At least one swivel caster 51 is mounted on a caster plate 52 mounted on bottom wall 27 and is spaced to the rear of axle 45.

The outside surfaces of side walls 23,25 are provided with wheel wells 53 which give the wheels 41,43 a little more clearance from the outer surface of the side walls 23,25.

A ridge 55 is formed in the outer surface of side walls 23,25 for added strength. The ridges 55 break up the flat surface of the outside side walls, and minimize warp in this large flat section.

Hand holes 33,34 are provided in the upper portion of back wall 21 and are designed for easy pushing or pulling of the tilt truck 11 with a depending ridge 57 in the upper surface of the hand holes, and an upstanding ridge 59 in the lower surface of the hand holes.

The hand holes 35,36 are designed for easier tilting of the tilt truck 11 and is provided with a groove 61 in the upper surface of the handhold for easier gripping with the fingers and easier tilting.

The inner surfaces of side walls 23,25 and back wall 21 are beveled outwardly from bottom to top for easier cleaning of those surfaces.

Axle 45 is held in place by a center hold-down plate 63 and side hold-down plates 65, 66 which are fastened to the bottom wall 27 by screws 67 that screw into T-nuts 69 molded into the plastic.

Stiffening grooves 71,73 are formed in front wall 19 and bottom wall 27 and comprise grooves formed in the outer wall 17 so that they contact and support the inner wall 15.

Further support of the inner wall 15 is provided by stiffener indentations 75, 77, and 79 where the outer wall 17 is molded into supporting contact with inner wall 15 in the bottom wall 27 of the tilt truck 11.

In operation, tilt truck 11 may be loaded with various materials and then pushed or pulled by using hand holes 33,34 to an appropriate dump site. Then the materials may be dumped by using the dumping hand holes 35,36 to lift the back wall 21 and lower the front wall 19 with the tilt truck pivoting about rocker base 29 which contacts the floor 81. The tilting motion continues until tilt stop 31 also contacts the floor 81 which is beside an opening to a container that receives the contents of the tilt truck.

The tilt truck of this invention has many advantages. It is without a separate metal frame and has an integral tank and frame which is seamless molded of FDA-approved polyethylene into a one-piece unit. It has molded-in hand holes and grips and is easy to maneuver, even when loaded with heavy materials. It has a built in rocker base and can be dumped with minimum effort simply by lifting the tilt truck forward on the rocker base. The inventive tilt truck needs no metal framing because it is constructed of heavy double-walled plastic that provides inherent ruggedness and dimensional stability. Also, the plastic is chemically inert and odor resistant, and it does not rust, flake, or peel.

I claim:

1. A tilt truck comprising
a double-walled integral tank and frame having outer and inner walls of plastic,
said integral tank and frame being of one-piece construction,
said integral tank and frame having a front tilt wall connected to a back wall by a pair of side walls and having a bottom wall connected to the bottom edges of the front, back and side walls,
said tank and frame having an open top,
the front wall being slanted away from the bottom wall,
a rocker base formed in the lower portion of the front wall,
a tilt stop formed in the upper portion of the front wall,
hand holes formed in the back wall,
and roller means mounted on the bottom wall to provide mobility.

2. The tilt truck of claim 1,
said integral tank and frame being made of FDA-approved polyethylene.

3. The tilt truck of claim 1,
said integral tank and frame being of seamless construction.

4. The tilt truck of claim 1,
said roller means comprising a wheel axle seated in the bottom of the bottom wall in an axle groove formed in the bottom wall with a wheel rotatably mounted at each end of the axle,
and at least one swivel caster mounted on the bottom wall and spaced away from the wheel axle to form, with the wheels, at least a three point rolling contact with a floor.

5. The tilt truck of claim 1,
further including a pair of hand holes in the upper portion of the back wall of the integral tank and frame molded through the top portion of the back wall and spaced opposite one another equally distant from a longitudinal center line of the back wall to facilitate pushing and pulling of the tilt truck,
the hand holes each having an upper surface and a lower surface,
the hand holes each having a depending ridge in the upper surface of the hand hole and an upstanding ridge in the lower surface of the hand hole.

6. The tilt truck of claim 1,
further including a pair of hand holes located in the upper half portion of the back wall of the integral tank and frame,
the hand holes each having an upper surface and a lower surface, and
the hand holes having a groove in the upper surface of each hand hole for easier gripping with the fingers and easier tilting.

7. The tilt truck of claim 1,
further including a pair of stiffening grooves formed in the front wall and bottom wall comprising grooves formed in the outer wall of the double-walled integral tank and frame which contact and support the flat inner wall.

8. The tilt truck of claim 1,
further including at least one stiffener indentation in the bottom wall comprising an indentation formed in the outer wall of the double-walled integral tank and frame that contacts and supports the flat inner wall.

9. A tilt truck comprising
a double-walled integral tank and frame having outer and inner walls of plastic,
said integral tank and frame being of one-piece construction,
said integral tank and frame having a front tilt wall connected to a back wall by a pair of side walls and having a bottom wall connected to the bottom edges of the front, back and side walls,
said tank and frame having an open top,
the front wall being slanted away from the bottom wall,
a rocker base formed in the lower portion of the front wall,
a tilt stop formed in the upper portion of the front wall,
hand holes formed through the back wall,
roller means mounted on the bottom wall to provide mobility,
said integral tank and frame being made of FDA-approved polyethylene,
said integral tank and frame being of seamless construction,
said roller means comprising a wheel axle seated in the bottom of the bottom wall in an axle groove formed in the bottom wall with a wheel rotatably mounted at each end of the axle,
and at least one swivel caster mounted on the bottom wall and spaced away from the wheel axle to form, with the wheels, at least a three point rolling contact with a floor.

10. A tilt truck comprising
a double-walled integral tank and frame having outer and inner walls of plastic,
said integral tank and frame being of one-piece construction,
said integral tank and frame having a front tilt wall connected to a back wall by a pair of side walls and having a bottom wall connected to the bottom edges of the front, back and side walls,
said tank and frame having an open top,
the front wall being slanted away from the bottom wall,
a rocker base formed in the lower portion of the front wall,
a tilt stop formed in the upper portion of the front wall,
hand holes formed through the back wall,
roller means mounted on the bottom wall to provide mobility, said integral tank and frame being made of FDA-approved polyethylene, said integral tank and frame being of seamless construction, said roller means comprising a wheel axle seated in the bottom of the bottom wall in an axle groove formed in the bottom wall with a wheel rotatably mounted at each end of the axle.

and at least one swivel caster mounted on the bottom wall and spaced away from the wheel axle to form, with the wheels, at least a three point rolling contact with a floor, further including a pair of hand holes in the upper portion of the back wall of the integral tank and frame molded through the top portion of the back wall and spaced opposite one another equally distant from a longitudinal center line of the back wall to facilitate pushing and pulling of the tilt truck, the hand holes each having an upper surface and a lower surface, the hand holes each having a depending ridge in the upper surface of the hand hole and an upstanding ridge in the lower surface of the hand hole, further including a pair of hand holes located in the upper half portion of the back wall of the integral tank and frame, the hand holes each having an upper surface and a lower surface, and the hand holes having a groove in the upper surface of each hand hole for easier gripping with the fingers and easier tilting, further including a pair of stiffening grooves formed in the front wall and bottom wall comprising grooves formed in the outer wall of the double-walled integral tank and frame which contact and support the flat inner wall, further including at least one stiffener indentation in the bottom wall comprising an indentation formed in the outer wall of the double-walled integral tank and frame that contacts and supports the flat inner wall.

* * * * *